Sept. 21, 1965 G. HEDBERG ETAL 3,207,194
ROLLER BAR MOUNTING IN A LATHE
Filed March 29, 1960
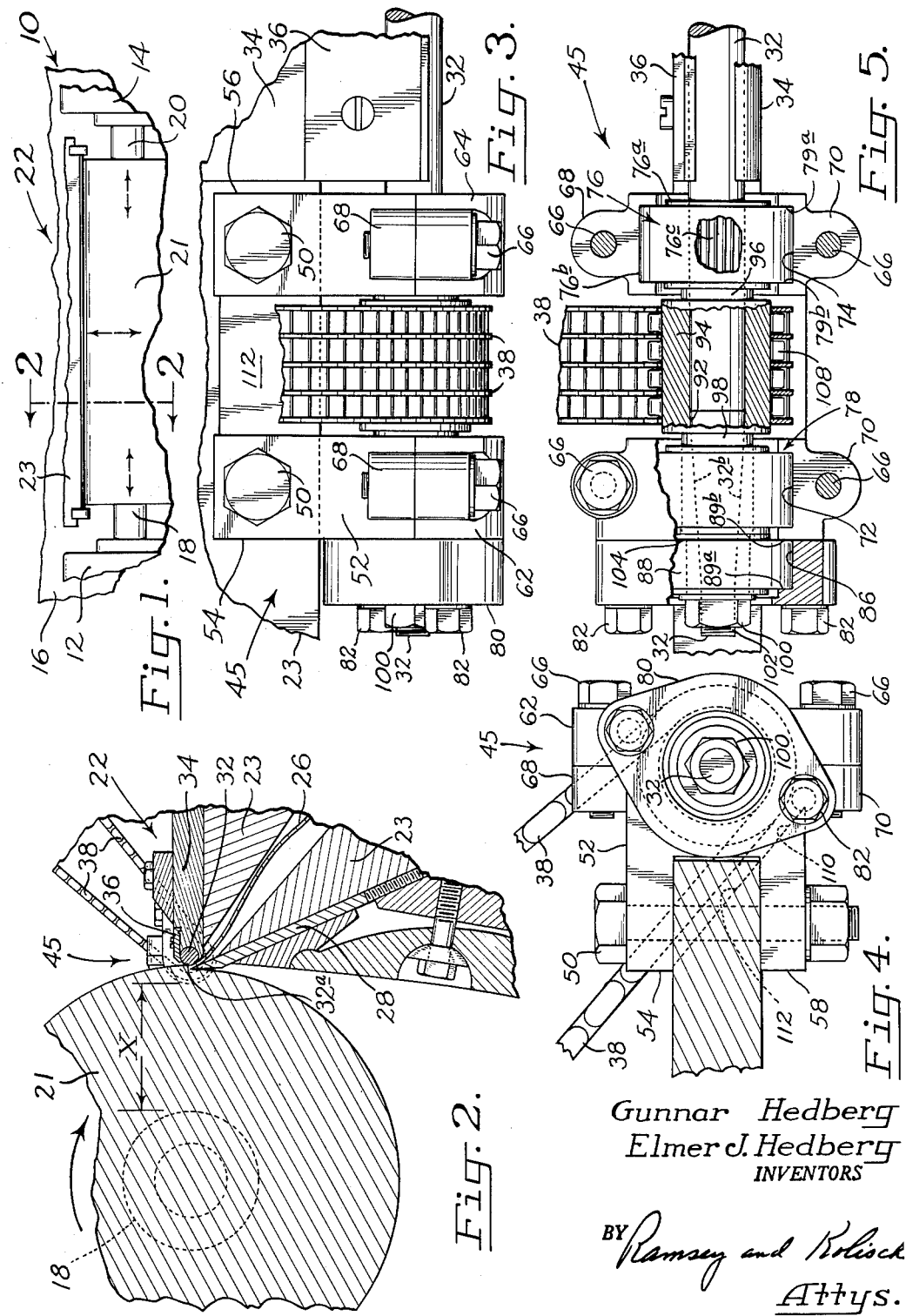
Gunnar Hedberg
Elmer J. Hedberg
INVENTORS
BY Ramsey and Kolisch
Attys.

3,207,194
ROLLER BAR MOUNTING IN A LATHE
Gunnar Hedberg and Elmer J. Hedberg, Brookings, Oreg., assignors, by mesne assignments, to Marion and Emily Thomas, Portland, Oreg.
Filed Mar. 29, 1960, Ser. No. 18,282
6 Claims. (Cl. 144—213)

This invention relates to a construction for the mounting of a roller-bar mechanism in a veneer lathe, such roller-bar mechanism conventionally being used for the purpose of bearing down against the periphery of a peeler log as the cutting knife of the lathe cuts into the log to cut veneer therefrom.

In a typical veneer lathe there are a pair of opposed pedestals at either end of the lathe, such pedestals mounting axially aligned chuck mechanisms that are moved axially toward each other to bite the ends of a log disposed therebetween. To one side of and relatively movable in a radial direction with respect to the chuck mechanisms is the usual knife and roller-bar means. As veneer is peeled from the log, relative radial movement of the knife and roller-bar means toward the chuck mechanisms is necessary. Such inward movement continues until the peeler log has been reduced to a small core.

Greatest use of the log results if the peeler log is reduced to a core of smallest possible diameter. One of the factors limiting the minimum possible diameter of a core is that as the roller bar is advanced radially toward the log center, bearing structure rotatably mounting an end of the bar at the same time advances toward and eventually may be caused to strike an adjacent chuck mechanism. A relatively small core diameter is possible only if the bearing structure projects a minimum distance outwardly from the roller bar toward an adjacent chuck mechanism. Complicating the construction of the bearing structure is that while the bearing structure for the end of a roller bar should be compact and protrude as little as possible from the roller bar, during the cutting of veneer the roller bar is subjected to quite severe stresses, and any bearing structure should be able to withstand heavy pressures exerted both in a radial and axial direction.

It is a general and primary object of this invention to provide a veneer lathe with an improved construction for the bearing structure mounting an end of its roller bar, whereby the projection of the bearing structure from the roller bar is relatively insignificant, and this is done without sacrificing suitable strength and sturdiness in the bearing structure.

Another feature and object of the invention is to provide an improved bearing construction for the roller bar of a lathe well suited to withstand end thrusts in the roller bar exerted in either of opposite axial directions, and further to provide such a bearing construction which is relatively easy to repair in the event of failure in the structure resisting end thrusts.

In a veneer lathe including a roller bar and knife movable radially relative to opposed chuck mechanisms, the relative positions of the knife with respect to the roller bar and the knife and roller bar with respect to the centers of the chuck mechanisms are highly critical. If the relative position of the knife and roller bar, for instance, is not exactly correct, cutting is difficult, thick and thin cutting may result, the veneer cut from the log may tend to break, etc. Thus the mounting of a roller bar on the usual frame structure that ordinarily supports it has been a difficult job requiring a high degree of skill. This has complicated the problem of replacing or repairing any antifriction bearings employed in the bearing structure for the roller bar. To replace such antifriction bearings in the past, commonly it has been necessary to remove the entire bearing structure from the frame that mounts it, thus destroying the positioning of the bearing structure with respect to the knife and frame. Another object and feature of the invention, therefore, is the provision of novel bearing structure for a roller bar that may be easily disassembled to enable antifriction bearings in the structure to be replaced, without destroying the positioning of the mounting for the antifriction bearings.

Another feature of the invention is the provision of a construction which accommodates easy replacement of any antifriction thrust-bearing assembly in the construction, without destroying the position of any antifriction radial-bearing assemblies in the construction.

The bearing construction contemplated may be manufactured at a relatively low unit cost. Further, antifriction bearing assemblies of readily available sizes may be used in the construction.

Other objects, features and advantages are attained by the invention, which is described hereinbelow in conjunction with the accompanying drawings, wherein:

FIG. 1 is a plan view, greatly simplified, of a conventional veneer lathe, showing its opposed chuck mechanisms, and a roller bar off to one side of the chuck mechanisms;

FIG. 2 is a section view, generally along the line at 2—2 in FIG. 1, and enlarged, showing relative radial positions of the chuck elements with respect to the roller bar and knife, and also illustrating how the bearing structure for a roller bar limits the extent a peeler log may be cut;

FIG. 3 is an enlarged plan view of an embodiment of the bearing construction contemplated for an end of a roller bar;

FIG. 4 is an end view of the bearing construction in FIG. 3; and

FIG. 5 is a side view of the bearing construction of FIGS. 3 and 4, with portions removed to illustrate details.

Referring now to the drawings, and in particular to FIGS. 1 and 2, 10 indicates generally and in somewhat simplified form a conventional type of veneer lathe, comprising opposed pedestals 12 and 14 mounted on a frame 16. Projecting inwardly from pedestals 12, 14 are a pair of opposed, axially aligned chuck mechanisms, indicated at 18 and 20. These chuck mechanisms are relatively axially movable, whereby they may be brought together to bite into the ends of a log, indicated at 21. Extending alongside and substantially paralleling the axial centers of the chuck mechanisms is a roller-bar and knife means, shown generally at 22. The latter means is mounted on shiftable frame structure 23, movable to and fro on ways (not shown) whereby the roller-bar and knife means may be shifted radially relative to the axial centers of chuck mechanisms 18, 20. The double headed arrows in FIG. 1 illustrate the various relative movements so far described.

Considering now more particularly FIG. 2, log 21 is shown in section, and the outline of chuck mechanism 18 is shown in dashed lines. The log during operation of the lathe is rotated in the direction of the arrow in FIG. 2, against a knife 28 and a roller bar 32 of roller-bar and knife means 22, to produce a sheet of veneer designated at 26.

Roller bar 32 is mounted in a roller-bar case or strongback 34, that extends substantially the length of the roller bar. Case 34 in the usual instance is provided with a detachable upper plate 36, which can be removed when it is desired to remove the roller bar from the case. The upper plate and the main body of the roller-bar case are provided with wall portions defining an elongated, substantially cylindrical cavity containing the roller bar, with the roller bar at 32a protruding out from one side of this cavity in position to contact a log as the same is rotated thereby. A drive means is provided the roller bar, whereby it may be rotated so that its peripheral speed substantially corresponds to the peripheral speed of log 21. This drive means is represented by chain belt 38 drivingly connected to one end of the roller bar. This same end of the roller bar is rotatably supported in the bearing construction of this invention, indicated generally at 45, which operates to hold the bar from shifting axially in either of opposite directions in case 34, and also resists radial pressures in the end of the bar where drive is to the bar.

Considering now in more detail bearing structure 45, and now referring more in particular to FIGS. 3, 4, and 5, secured as by nut and bolt assemblies 50 to frame 23 is a bearing base 52. This has a pair of spaced upper leg portions 54, 56 projecting from the front of the base that overlie a bottom flange 58, and nut and bolt assemblies 50 extend through accommodating bores provided these leg portions and flange to join the bearing base securely in place on frame 23.

Detachably secured over the back of bearing base 52 are a pair of cap portions 62, 64. Each is aligned with one of the leg portions 54, 56, and has its ends secured in place on the base as by screws 66 that extend through the cap portion and complementing ears 68, 70 provided in the top and bottom of the bearing base, respectively. The bearing base and cap portions have wall portions defining concave recesses therein, which, when the bearing base and cap portions are secured together, define a pair of axially spaced, bearing-receiving cavities, indicated at 72, 74. One of these is substantially directly behind each of the leg portions 54, 56. The axial centers of these bearing-receiving cavities are aligned, and aligned substantially with the axial center of roller bar 32.

Fitted snugly in the bearing-receiving cavities 72, 74, and thus spaced axially one from the other, are a pair of antifriction bearing assemblies, indicated at 76, 78. As is conventional with antifriction bearing assemblies, as the term is used herein, each comprises relatively rotatable inner and outer parts (such as parts 76a, 76b for assembly 76) and a series of rolling antifriction members between the two parts operable to convert sliding friction into rolling friction. In the case of antifriction bearing assemblies 76, 78, these rolling members are to withstand radial pressures, as these bearing assemblies are radial-bearing assemblies. Preferably the rolling members take the form of needle bearings, exemplified by needle bearings 76c, since for a given size of bearing such can withstand relatively large radial pressures.

Detachably secured to one end bearing base 52 is a mounting portion indicated at 80. The connection of the mounting portion with the end of base 52 is by means of screws 82. Mounting portion 80 has inner wall portions defining a bearing-receiving cavity 86 axially aligned and communicating with bearing-receiving cavities 72, 74. An antifriction bearing assembly 88 is mounted within this bearing-receiving cavity, and this antifriction bearing assembly is to resist end thrust in either of opposite directions in roller bar 32. Thus this bearing assembly comprises a thrust-bearing assembly, preferably a ball-bearing assembly. Bearing assembly 88 is held in place against axial shifting by shoulders 89a, 89b. Assemblies 76, 78 are held from axial shifting by shoulders 79a, 79b.

The end of bar 32 is mounted within antifriction bearing assemblies 76, 78, 88 by inserting it through a tapered central bore 92 of a sprocket part 94. The end of the bar is tapered slightly at 32b so that it conforms to the taper of bore 92. Sprocket part 94 includes a sleeve end 96 encircling a portion of the end of bar 32 and snugly received within the right antifriction bearing assembly 76 in FIG. 5, and a sleeve end at 98 encircling a portion of bar 32 snugly received within antifriction bearing assemblies 78, 88 at the left in FIG. 5. End 32b of the roller bar extends completely through the sprocket part 94, and a nut 100 bearing on the inner race of assembly 88 is tightened on a threaded portion 102 of the bar to pull the tapered end of the bar tightly into tapered bore 92.

As already mentioned, antifriction bearing assembly 88 is confined from axial movement by shoulders 89a, 89b. Preventing axial movement of sprocket part 94 and bar 32 to the right relative to assembly 88 is nut 100 just described. Axial movement in the opposite direction is prevented by an annular step 104 of sleeve end 98 that bears against the inner race of bearing assembly 88.

A central portion 108 of sprocket part 94 is provided with the usual sprocket teeth and chain belt 38 is trained over this central position. The lower run of the chain belt in FIG. 4 travels over a sloping surface 110 of flange 58 and an inclined wall portion 112 of frame 23 in moving to the driving sprocket for the chain (not shown).

Summarizing features of the invention, it will be noted that bar 32 is provided with antifriction radial bearings on either side of the location where drive is transmitted to the roller bar. Axial movement of the bar in either of opposite directions is wholly restrained by an antifriction thrust-bearing assembly, spaced toward the outer end of the bar from the antifriction radial-bearing assemblies.

In the event it is desired to replace the antifriction thrust-bearing assembly, this may be done without displacing either the bearing base or the pair of antifriction radial-bearing assemblies. A repairman need only unscrew nut 100 and screws 82 holding mounting portion 80 on the bearing base, to enable loosening of the mounting portion and its removal from the base to expose the thrust-bearing assembly. Should it be desired to replace the antifriction radial-bearing assemblies 76, 78, mounting portion 80 is removed as described, and cap portions 62, 64 are removed by loosening screws 66. If the roller bar is then shifted axially to the right in FIG. 5, the bearing assemblies may be removed from the bearing base without disrupting the position of bearing base 52, which frequently must be babbitted in place in order to obtain proper positioning for the base.

Important is the fact that the thrust-bearing assembly is separate and spaced axially from the radial-bearing assemblies. This enables bearing assemblies of substantially reduced size to be used, and reduces to a minimum the projection of the cap portions 62, 64 toward the axial centers of the chuck mechanisms in the lathe. Referring to FIG. 2, the distance, designated as "X" is the maximum distance that the roller bar may be moved radially inwardly toward the chuck mechanisms without its end bearing structure striking one of the chuck mechanisms. By reducing the size of this end bearing structure, the distance "X" is increased proportionately, with the result that logs can be peeled to a smaller diameter.

One embodiment of the invention has been described, but it is appreciated that modifications within the invention are possible. It is intended to cover all modifications and variations that are apparent to those skilled in the art, and that come within the scope of the appended claims.

It is claimed and desired to secure by Letters Patent:

1. In a veneer lathe having a pair of opposed and relatively axially movable chuck mechanisms for mounting the ends of a log, cutting knife and roller-bar means and frame structure mounting the same shiftable in a radial direction relative to said chuck mechanisms with the roller-bar and knife means extending between and with their ends adjacent said chuck mechanisms, said roller-bar means having an end that in at least some relative positions of said chuck mechanisms extends outwardly of its adjacent chuck mechanism, the improvement comprising a mounting and drive means for said end comprising a bearing base mounted on said frame structure, cap means detachably secured to said bearing base, said cap means and base having wall portions defining a pair of aligned bearing-receiving cavities, an antifriction radial-bearing assembly mounted in each of said cavities and journaling axially spaced portions of said end, a sprocket made fast to and encircling a portion of said end intermediate said antifriction radial-bearing assemblies, a drive belt trained over said sprocket, an antifriction thrust-bearing assembly journaling said end and spaced axially outwardly from said antifriction radial-bearing assemblies, and a detachable mounting for said thrust-bearing assembly positioned to one side of said base.

2. In a veneer lathe having a pair of opposed and relatively axially movable chuck mechanisms for mounting the ends of a log, cutting knife and roller-bar means and frame structure mounting the same shiftable in a radial direction relative to said chuck mechanisms with the roller-bar and knife means extending between and with their ends adjacent said chuck mechanisms, said roller-bar means having an end that in at least some relative positions of said chuck mechanisms extends outwardly of its adjacent chuck mechanism, the improvement comprising a mounting and drive means for said end comprising a bearing base mounted on said frame structure, cap means detachably secured to said bearing base, said cap means and base having wall portions defining a pair of aligned bearing-receiving cavities concentric with said end with one spaced axially outwardly of the other, a mounting portion detachably secured to said bearing base and cap means and having wall portions defining a bearing-receiving cavity communicating with and aligned with said one of the first-mentioned bearing-receiving cavities, an antifriction radial-bearing assembly mounted in each of said first-mentioned bearing-receiving cavities and rotatably journaling spaced portions of said end, an antifriction thrust-bearing assembly mounted in the bearing-receiving cavity of the mounting portion and journaling said end at a location spaced axially outwardly from said antifriction radial-bearing assemblies, a sprocket made fast to and encircling a portion of said end of the bar means intermediate said antifriction radial-bearing assemblies, and a drive belt trained over said sprocket.

3. A mounting for an end of a veneer lathe roller bar comprising a bearing base, cap means detachably fastened to the bearing base, said cap means and base having wall portions defining a pair of aligned and axially spaced bearing-receiving cavities concentric with said end of the roller bar with the roller bar mounted in place, a mounting portion detachably secured to the bearing base and cap means and having wall portions defining a bearing-receiving cavity communicating with and aligned with one of the first-mentioned bearing-receiving cavities, an antifriction radial-bearing assembly mounted in each of the first-mentioned pair of bearing-receiving cavities and adapted to receive spaced portions of the roller bar end, an antifriction thrust bearing assembly mounted in the bearing-receiving cavity of the mounting portion and adapted to receive said end at a location spaced axially outwardly on the end of the roller bar from said antifriction radial-bearing assemblies, and a sprocket for driving the roller bar adapted to be mounted on the end of the roller bar intermediate and antifriction radial-bearing assemblies.

4. In a veneer lathe having a supporting frame member, a veneer knife, a roller bar parallel with the veneer knife, and drive means for the roller bar; the improvement of mounting means for journaling said roller bar, comprising, a base, means to secure the base to said frame member in a predetermined position relatively to said knife, a pair of bearing legs extended from said base horizonally generally at right angles to said veneer knife, a vertical face on the end of each leg having a semi-cylindrical bearing pocket therein, a cap fitting over each vertical leg face and having a semicyclindrical bearing pocket therein complemental to said bearing pocket in said leg face, bearings fitting into said complemental pockets, a drive element being journaled in said bearings and being connected to said roller bar, means to connect said drive element to the adjacent drive means, said base having a cavity therein to accommodate said connecting means, and detachable securing means extended through each cap and into the adjacent leg whereby each cap when detached is removable horizontally away from the adjacent end of the roller bar so as to leave the roller bar and said bearings exposed for horizontal removal away from said frame member.

5. In a veneer lathe having a frame, a roller bar rotatably supported on the frame, and power-operated drive means; means mounting an end of said roller bar on said frame comprising a bearing base, means securing said bearing base in a predetermined position on said frame, said bearing base having a pair of semicylindrical bearing pockets spaced axially with respect to the roller bar, cap means detachably fastened to said bearing base having a pair of semicylindrical bearing pockets complementing the bearing pockets of said base and forming with the pockets of said base a pair of axially spaced bearing-receiving cavities concentric with said end of the roller bar, a bearing assembly mounted within each of said bearing-receiving cavities, a drive member for the roller bar journaled in said bearing assemblies and fastened to the roller bar, said drive member having means for training a belt thereover positioned between said bearing assemblies, and drive belt means trained over the means for training said belt of said drive member and interconnecting said drive member and said power-operated drive means.

6. The lathe of claim 5, wherein said bearing assemblies mounted in said bearing-receiving cavities comprise antifriction radial-bearing assemblies, and which further include a mounting portion spaced axially outwardly on the end of the roller bar from said radial-bearing assemblies, said mounting portion having a bearing-receiving cavity concentric with the first-mentioned bearing-receiving cavities, and a thrust-bearing assembly mounted in the bearing-receiving cavity of said mounting portion with said thrust-bearing assembly also journaling said drive member.

References Cited by the Examiner
UNITED STATES PATENTS

| | | | |
|---|---|---|---|
| 1,845,515 | 2/32 | Osgood | 144—213 |
| 2,246,761 | 6/41 | Saliba et al. | 143—43—1.5 X |
| 2,600,347 | 6/52 | Wagner | 308—233 X |

FOREIGN PATENTS

| | | |
|---|---|---|
| 471,288 | 2/29 | Germany. |
| 249,033 | 3/26 | Great Britain. |

ANDREW R. JUHASZ, *Primary Examiner.*

MORRIS M. FRITZ, WALTER A. SCHEEL, WILLIAM W. DYER, JR., *Examiners.*